(12) United States Patent
Jackson et al.

(10) Patent No.: US 10,941,728 B1
(45) Date of Patent: Mar. 9, 2021

(54) SOOT MITIGATION

(71) Applicant: Green Light Industries, Inc., West Chicago, IL (US)

(72) Inventors: Gerald Peter Jackson, Lisle, IL (US); Joseph Matthew Zlotnicki, Downers Grove, IL (US)

(73) Assignee: Green Light Industries, Inc., West Chicago, IL (US)

( * ) Notice: Subject to any disclaimer, the term of this patent is extended or adjusted under 35 U.S.C. 154(b) by 0 days.

(21) Appl. No.: 16/267,358

(22) Filed: Feb. 4, 2019

Related U.S. Application Data

(63) Continuation-in-part of application No. 13/839,750, filed on Mar. 15, 2013, now Pat. No. 10,197,277.

(51) Int. Cl.
    *G05B 15/02*      (2006.01)
    *F02G 5/02*      (2006.01)
    (Continued)

(52) U.S. Cl.
    CPC .................. *F02G 5/02* (2013.01); *F02C 6/18* (2013.01); *F28D 21/0003* (2013.01); *G05B 15/02* (2013.01); *H02S 10/30* (2014.12)

(58) Field of Classification Search
    CPC ............. F23C 9/00; F23M 2900/13004; F23N 2900/05006; F23N 5/022; F23N 5/203; H02S 10/30
    See application file for complete search history.

(56) References Cited

U.S. PATENT DOCUMENTS

2003/0066290 A1* 4/2003 Murata ..................... F23N 3/02
    60/698
2005/0074646 A1* 4/2005 Rajashekara ..... H01M 8/04022
    429/435

(Continued)

*Primary Examiner* — Yuhui R Pan
(74) *Attorney, Agent, or Firm* — Peter K Trzyna

(57) ABSTRACT

A machine, method of making, and method of using, along with necessary intermediates, illustratively, by way of a method, there can be a method of generating electrical power, the method including: inputting air, including adjusting flow rate of the air; inputting fuel, including throttling flow rate of the fuel, wherein: the fuel flow rate and the air flow rate are in stoichiometric proportions for combustion, and the fuel is comprised of at least one hydrocarbon, alcohol, or both; combusting a mixture of the fuel and a portion of the air with the remainder of the air to produce heat, wherein: prior to the combusting: combining the portion of the air with the fuel to produce the mixture that, when heated, stoichiometrically forms syngas; heating the mixture with the heat from the combusting; heating the remainder of the air with the heat from the combusting; and during the combusting, matching the remainder of the air with at least one of flow rate, pressure drop, and flow velocity of the mixture; generating electromagnetic emissions from the heat; harvesting the electromagnetic emissions with photovoltaic elements to produce electrical power; processing exhaust gasses produced during the combusting, wherein heat released from the processing is transferred into the mixture and the remainder of the air before the combusting, and the processing removes one or more pollutants from the exhaust gasses; measuring the oxygen content of the exhaust gasses before the processing in ensuring the stoichiometric proportions.

32 Claims, 16 Drawing Sheets

(51) Int. Cl.
  *F28D 21/00* (2006.01)
  *F02C 6/18* (2006.01)
  *H02S 10/30* (2014.01)

(56) References Cited

U.S. PATENT DOCUMENTS

2013/0089799 A1* 4/2013 Reuber ................. B25B 27/302
                                                     429/423
2013/0125554 A1* 5/2013 Mittricker ............... F01K 23/10
                                                      60/772

\* cited by examiner

US 10,941,728 B1

SOOT MITIGATION

This patent application is a continuation-in-part, claims priority, and incorporates by reference, from U.S. patent application Ser. No. 13/839,750 having the title "Chemically Heated Hot Emitter Generator System" and filed Mar. 15, 2013.

I. TECHNICAL FIELD

The technical field includes machine, manufacture, process, and product produced thereby, as well as necessary intermediates, which pertain to power sources, units thereof, computer systems used to facilitate operation of one or more power sources.

II. BRIEF DESCRIPTION OF THE DRAWINGS

For a more complete understanding, reference is made to the following description and accompanying drawings, in which.

III. MODES

A chemically heated hot emitter generator is a generator of electricity. The generator is comprised of a hot or heated emitter and one or more photovoltaic cells that convert emitted electromagnetic radiation into electric power, non-limiting examples are disclosed in Ser. Nos. 60/833,335; 60/900,866; 11/828,311; 12/375,176; PCT/US2007/074446; and Ser. No. 13/595,062 all of which are incorporated by reference as if fully restated herein.

Chemically heated hot emitter generators enable distributed electric power generation, e.g. where generators are located at individual buildings, groups of buildings, and/or neighborhoods instead of centralized at a power plant. The distributed structures disclosed herein eliminate losses due to the transmission of the electric power from the centralized power plant to the individual buildings, groups of buildings, or neighborhoods, and can, depending upon the embodiment, be more efficient and more robust than generating power at a centralized power plant. Also, if the local generation capacity is sufficient to meet all the local power needs, this distributed structure reduces or eliminates the potential for large-area blackouts due to the centralized power plant going offline or the loss of the transmission lines between the centralized power plant and the individual buildings, groups of buildings, or neighborhoods.

Producing electric power using a plurality of chemically heated hot emitter generators located close to their electric power consumer(s) and/or customer(s) has a number of functions that are unique in connection with forming a new industry, compared to conventional electric power generation, and such functions can be addressed by embodiments discussed hereafter.

Figure 1:
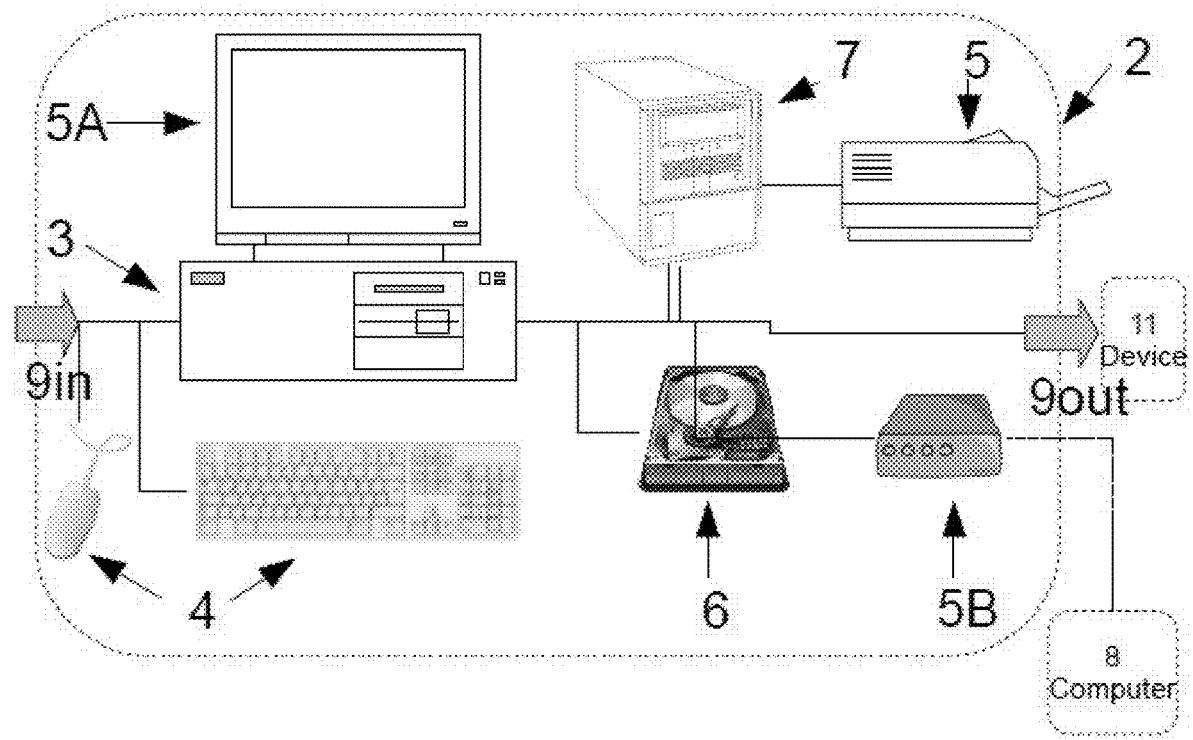
FIG. 1 is an illustration of an embodiment of a computer system.

FIG. 1 illustrates a computer system [2], such as an IBM, Hewlett Packard, or other computer with input and output devices, but a system can have any or all of the components depending on the embodiment at issue. computer system [2] can have one or more Processors [3] (e.g., an Intel or AMD series processor or the like), a memory [6] (e.g., a hard drive, disk drive, ROM, etc.), computer readable medium [7], input devices [4] (e.g., keyboard, mouse, modem [5B], or the like), and one or more output devices [5] (e.g., a Hewlett Packard™ printer [5], a Dell monitor [5A], a modem [5B], or other such output device). Note that the modem [5B] is representative of a computer-to-computer communication device that can operate as an IO [9] (input-output) device. In some embodiments the computer system [2] can be comprised of an embedded processor [3] such as a Cypress PSoC 5. In other embodiments the computer system [2] can be comprised of a field-programmable gate array (FPGA) or other hardware where algorithm logic is hard-wired rather than stored in memory.

Depending on the embodiment desired, the computer system [2] can communicate with one or more other computers, illustrated in FIG. 1 as a box, but understood to comprise one or more computers which can be communicatively associated or linked, e.g. as networked computer [8], which can, but need not, be an equivalent computer or computer system with respect to computer or computer system [2].

The computer system [2] can, also depending on the embodiment preferred for a given application, be in communication with equipment, or device [11], which is shown illustratively as a box device [11] in FIG. 1 so as to indicate that equipment or device [11] can be one or more devices [11]. For example, device [11] can comprise one or more chemically heated hot emitter generators. This communication can include input [9A] from the device [11] and output [9B] to the device [11].

Figure 2:
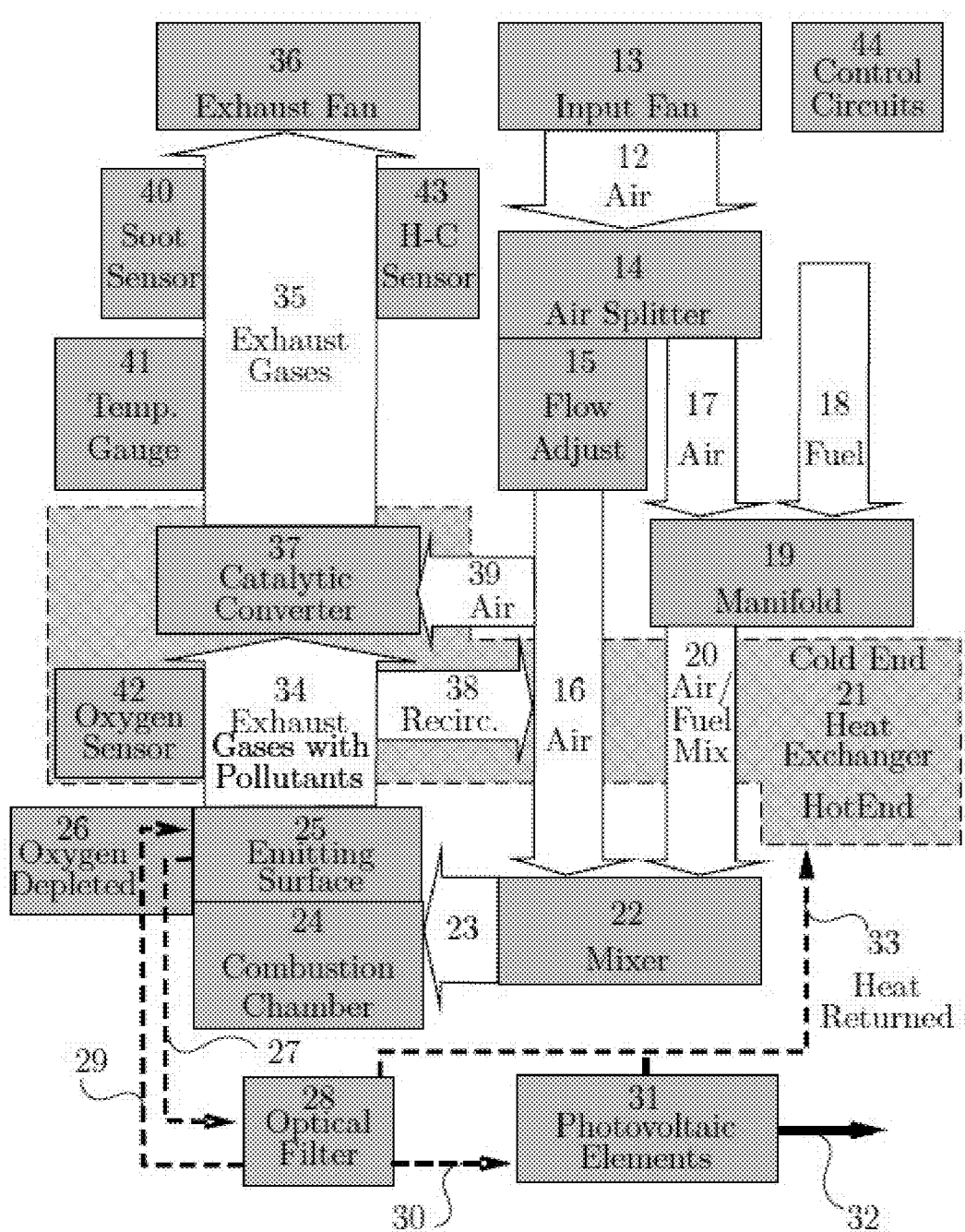
FIG. 2 is an illustration of an embodiment of a chemically heated hot emitter generator of electromagnetic emissions.
Figure 3:
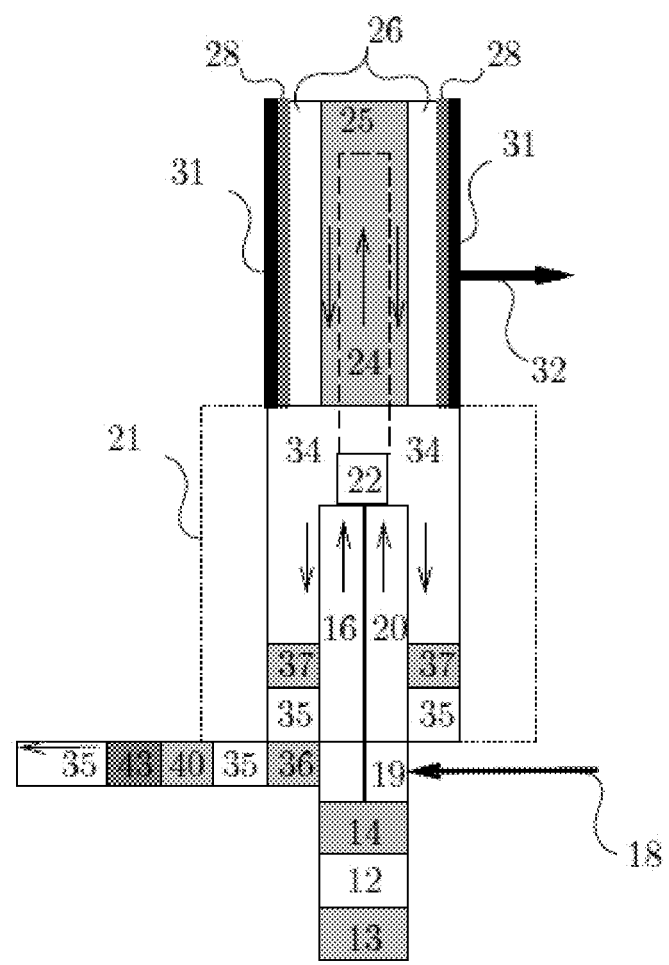
FIG. 3 is an illustration of an embodiment of a chemically heated hot emitter generator of electromagnetic emissions.

FIG. 2 and FIG. 3 show a chemically heated hot emitter generator of electromagnetic emissions embodiment of a device [11]. The chemical heating is from an exothermic chemical reaction which, depending upon the embodiment, could involve a flame, a plasma, etc. In this embodiment, input air [12] is pushed into an air splitter [14] by an input fan [13] (by fan we mean fan, blower, pump, or other means for moving material) where it is split by an air splitter [14] into air without fuel [16] and air with fuel [17], with the proportion of each determined by a flow adjuster [15]. Note that input air [12] is not restricted to atmospheric air; in some embodiments it is enriched in oxygen, it may be pure oxygen or some other mixture or chemical formulation, and in some embodiments the chemical reactant is not oxygen. In some embodiments, the input air [12] and/or the input fuel [18] are not gases. The air with fuel [17] is mixed with input fuel [18] in a manifold [19] to make an air/fuel mixture [20]. Both the air without fuel [16] and the air/fuel mixture [20] are heated in a heat exchanger [21] before they are mixed in a mixer [22]. This combustion input [23] enters a combustion chamber [24] wherein it reacts and heats the hot emitting surface [25]. This emitting surface [25] emits electromagnetic emissions [27], in some embodiments through an oxygen depleted region [26] which is comprised of a vacuum, air/fuel mixture [20], exhaust gasses [35], or some other oxygen depleted gas, depending upon the embodiment. In some embodiments the electromagnetic emissions [27] pass through an optical filter [28] which can, but need not, return some reflected emissions [29] to the emitting surface [25] and passing selected transmitted emissions [30] to the photovoltaic elements [31] which produce output power [32]. In some embodiments the optical filter [28] and/or the photovoltaic elements [31] are cooled and the heat can be, but need not be, returned to the input air [12], air without fuel [16], and/or the air/fuel mixture [20]. The exhaust gasses with pollutants [34] from the combustion chamber [24] and the emitting surface [25] enter a catalytic converter [37] where some pollutants are removed. Heat is also removed by the heat exchanger [21] and is used to heat the air without fuel [16] and the air/fuel mixture [20]. In some embodiments, part of the exhaust gasses [35] is recirculated exhaust gas [38] to the air without fuel [16], the air/fuel mixture [20], or both. In some embodiments, additional air [39] is supplied to the catalytic converter [37]. After the catalytic converter [37], the exhaust gasses [35] is removed by an exhaust fan [36]. The combustion processes and operation of the device [11] are monitored by one or more sensors (e.g. an oxygen sensor [42], a temperature gauge [41], a soot sensor [40], and a hydrocarbon sensor [43]) and is controlled using control circuits [44]. Some embodiments have additional sensors, including multiple sensors of the same type.

Figure 4:
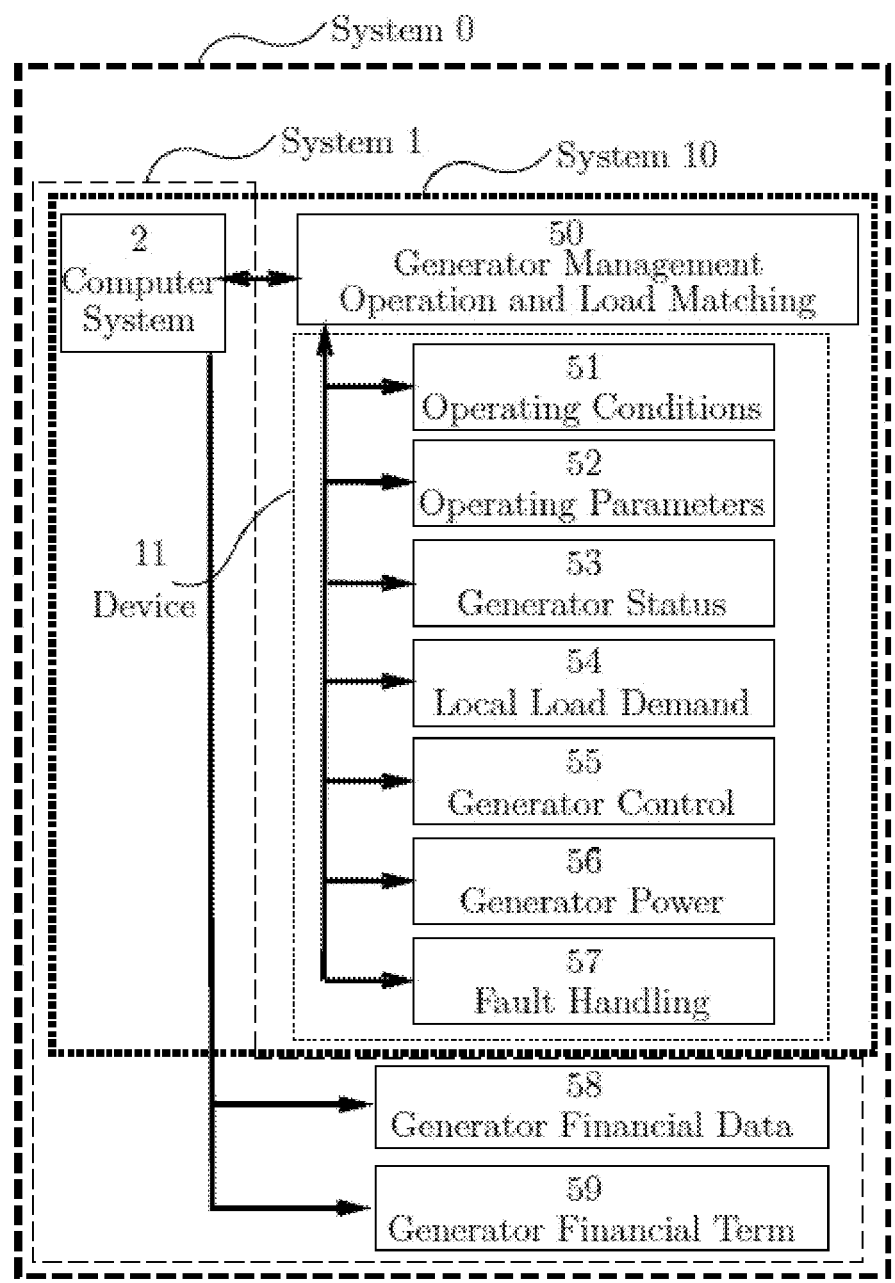
FIG. 4 is an illustration of an embodiment of generator management.

FIG. 4 shows an embodiment of a device [11] managed by a computer system [2]. The computer system [2] can communicate with one or more devices [11] which may, but need not in all cases depending upon the embodiment, be the one or more chemically heated hot emitter generators such as the embodiment shown in FIG. 2 and FIG. 3. These devices [11] can report their operating conditions [51] and generator status [53] which may, but need not, include fault handling [57]. The computer system [2] can send generator control [55] signals to change operating parameters [52] which may, but need not, include fault handling [57] responses and adjustments to match the generator power delivered [56] to the local load demand [54]. Note that in some embodiments the computer system [2] may be comprised of a micro controller located in or adjacent to the chemically heated hot emitter generator to carry out some or all of these functions.

FIG. 4, and that identified therein, illustrates a system [0], which comprises a means for receiving digital data representing a chemically heated hot emitter generator of electromagnetic emissions, and processing the digital data representing the chemically heated hot emitter generator of electromagnetic emissions. The thin dashed lines in FIG. 4 encompassing financial system [1] and the thick dotted lines encompassing control system [10] illustrate that in some, but not all, embodiments there can be a "means for" that includes generator financial data [58] and/or generator financial term [59], and computer system [2]; or a "means for" that includes generator status [50] and Load Matching, and any or all of items [51]-[59] and computer system [2]; and system [0] comprises both.

In the embodiments of FIG. 4, with respect to this "means for" illustrating computer system [2] may, or may not, depending on the particular configuration desired, comprise the same computer or a separate computer.

Figure 5:
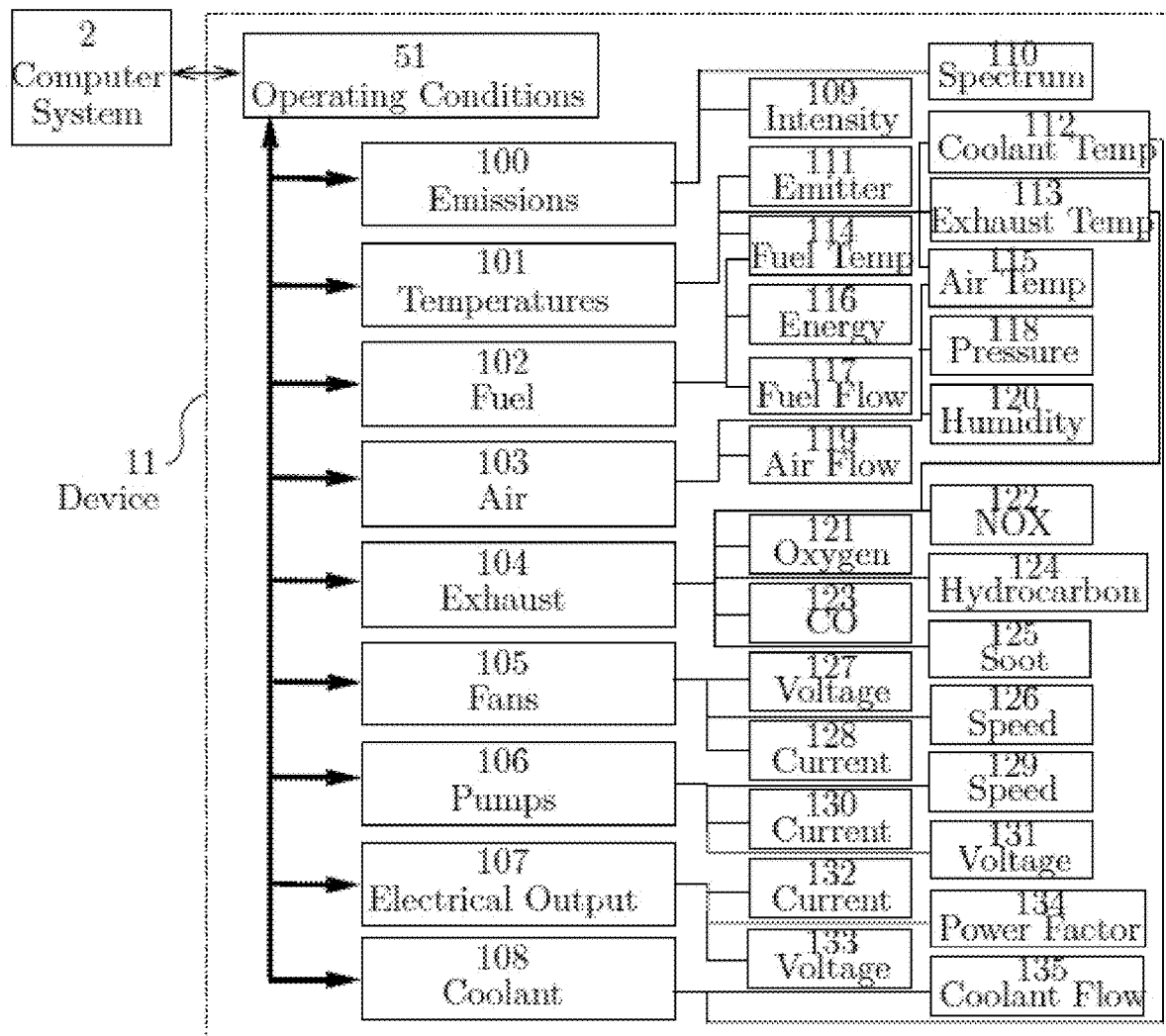
FIG. 5 is an illustration of an embodiment showing some possible operating conditions.

FIG. 5 shows an embodiment with more details about operating conditions [51] of a chemically heated hot emitter generator. As non-limiting examples, the computer system [2] can receive measurements relating to one or more of electromagnetic emissions [100], temperatures [101], fuel [102], air [103], exhaust [104], fans [105], pumps [106], coolant [108], and electrical output [107].

Some examples of operating conditions [51] related to electromagnetic emissions [100] include intensity [109] and spectrum [110]. Both the intensity [109] and the spectrum [110] are related to the emitter temperature [111]. Depending upon the emitter material, the spectrum [110] can be close to a black body spectrum, or emission at some wavelengths could be suppressed while other wavelengths can be enhanced. The shape of the spectrum [110] can change in time as the composition of the emitter changes, as may occur as the emitter deteriorates. Therefore monitoring of the spectrum [110] in some embodiments is a diagnostic tool capable of indicating when maintenance is required, for example by replacing the emitter. Similarly, the intensity [109] of the electromagnetic emissions is a strong function of emitter temperature [111]. In some embodiments, the intensity [109] is monitored through a window or filter that can deteriorate, and a reduced intensity [109] for a given emitter temperature [111] is an indication that maintenance is required.

Some examples of temperatures [101] include emitter temperature [111], exhaust temperature [113], input fuel temperature [114], and input air temperature [115], and coolant temperature [112]. For a properly operating device [11], there is a clear correlation between some of these temperatures [101]. For example, in some embodiments the difference between input air temperature [115] and exhaust temperature [113] is an indication of whether the device [11] is in the process of warming up or is in equilibrium. This information can be used, depending upon the embodiment, by the control algorithm [151] to adjust the input air flow [119] and input fuel flow [117], for example, for optimum operation. The emitter temperature [111] is related to the spectrum [110] and the intensity [109], and the intensity [109] is related to the maximum output current [132]. Therefore in some embodiments the control algorithm [151] will control signals [152] to change the emitter temperature [111] by changing, for example, a fan current [128] and a pump current [130] to change the input air temperature [115]

and the input fuel flow [117], in order to match the generator power delivered [56] to the load [160].

Some examples of fuel [102] operating conditions [51], one or more of which may, but need not, be used in an embodiment, include input fuel flow [117], fuel energy content [116], and input fuel temperature [114]. Some embodiments can use multiple fuels or change from one fuel to another (e.g. natural gas for hydrogen), and some embodiments use fuels with varying composition, so in some embodiments an important operating condition [51] is the fuel energy content [116]. The control algorithm [151] in some embodiments adjusts the input fuel flow [117] based upon the fuel energy content [116] measurement to maintain the desired emitter temperature [111].

Some examples of air [103] operating conditions [51], one or more of which may, but need not, be used in an embodiment, include input air flow [119], input air temperature [115], input air pressure [118], and input air humidity [120]. In some embodiments the control algorithm [151] adjusts the input air flow [119] based upon the input air temperature [115] and input air pressure [118] in order to make a desired match (e.g. stochiometric, rich, or lean) with the fuel based upon the input fuel flow [117] and the input fuel temperature [114].

Some examples of exhaust [104] operating conditions [51], one or more of which may, but need not, be used in an embodiment, include exhaust temperature [113], exhaust oxygen content [121], exhaust NOX content [122], exhaust CO content [123], exhaust hydrocarbon content [124], and exhaust soot content [125]. Monitoring the exhaust [104] operating conditions [51] allows the control algorithm [151] to use feedback [153] to adjust the input air flow [119] and input fuel flow [117] to maintain the desired stochiometric mixture. If the mixture is lean, the exhaust oxygen content [121] may be high. If the mixture is rich, exhaust CO content [123] and/or exhaust hydrocarbon content [124] may be high. Detection of excess levels of exhaust NOX content [122] or exhaust soot content [125] could be an indication of a fault condition or in some embodiments an indication that an adjustment is needed in the exhaust recirculation of air injection before the catalytic converter. Some embodiments measure exhaust temperature [113], exhaust oxygen content [121], exhaust NOX content [122], exhaust CO content [123], exhaust hydrocarbon content [124], and exhaust soot content [125] both before and after a catalytic converter. In some embodiments the control algorithm [151] uses these measurements in a feedback [153] loop to control the operation of the catalytic converter.

Some examples of fans [105] operating conditions [51], one or more of which may, but need not, be used in an embodiment, include fan speed [126], fan current [128], and fan voltage [127]. Some embodiments have multiple fans that are adjusted independently by the control algorithm [151]. For example, some embodiments have multiple fans on the input in order to adjust the fuel-to-air ratio in different parts of the device [11]. Some embodiments have fans on both the input and on the exhaust. Some embodiments have fans for exhaust recirculation. Some embodiments have fans for injecting air before the catalytic converter. Some embodiments have fans to move a gaseous coolant, which can be but need not be air. Deviations of the correlations between fan speed [126], fan current [128], fan voltage [127], and input air flow [119] or coolant flow [135] from normal operating conditions [163] in some embodiments is an indication of a fault condition.

Some examples of pumps [106] operating conditions [51], one or more of which may, but need not, be used in an embodiment, include pump speed [129], pump current [130], and pump voltage [131]. Some embodiments have multiple pumps that are adjusted independently by the control algorithm [151]. In some embodiments, pumps are used to supply liquid fuel. In some embodiments, pumps are used to move liquid coolant. Deviations of the correlations between pump speed [129], pump current [130], pump voltage [131], and input fuel flow [117] or coolant flow [135] from normal operating conditions [163] in some embodiments is an indication of a fault condition.

Some examples of coolant [108] operating conditions [51], one or more of which may, but need not, be used in an embodiment, include coolant flow [135] and coolant temperature [112]. The control algorithm [151] in some embodiments detects fault conditions if the coolant flow [135] is too low or if the coolant temperature [112] is either too high or too low, or if the rate of change of coolant temperature is too fast or too slow.

Some examples of electrical output [107] operating conditions [51] include output voltage [133], output current [132], and, for embodiments where the output is not direct current, output power factor [134], which can account, for example, for a phase difference between the voltage and the current for AC output.

Note that some operating conditions [51] fall into multiple categories, for example the input air temperature [115] falls into the categories of temperatures [101] and air [103]. Also, some operating conditions [51] do not fit into any of the existing categories. Both the listed categories [100]-[108] and the listed operating conditions [51] are intended to teach examples and are not intended to be complete lists.

Figure 6:
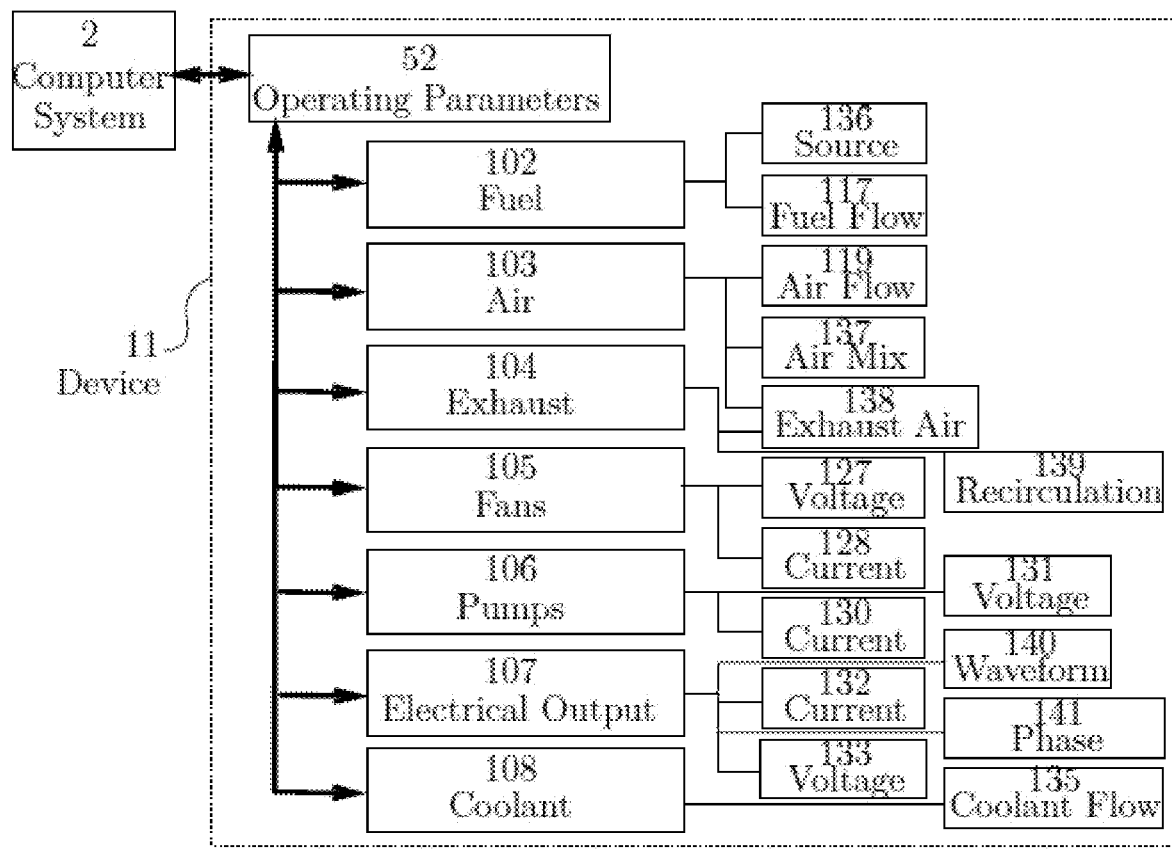
FIG. 6 is an illustration of an embodiment showing some possible operating parameters.

Related to the operating conditions [51] are the operating parameters [52] used for generator control [55]. An embodiment of some operating parameters [52] are shown in FIG. 6. Many of the categories of operating parameters [52] correspond to categories of operating conditions [51]: fuel [102], air [103], exhaust [104], fans [105], pumps [106], coolant [108], and electrical output [107]. These operating parameters [52] are controlled by the computer system [2] producing control signals [152] comprised of instructions that, when executed, result in changes to one or more operating parameters [52]. In some embodiments the control signal [152] is comprised of a change in a digital value sent to a digital-to-analog converter (DAC), changing a control voltage or current. In some embodiments the control signal [152] results in a valve opening or closing. Such an embodiment controls the fuel source [136], which in some embodiments is a different fuel with a different fuel energy content [116]. The valve in some embodiments is digital (open or closed), and in other embodiments the valve is analog, so for example the input fuel flow [117] can be adjusted by the control algorithm [151].

Some examples of air [103] and exhaust [104] operating parameters [52] include input air flow [119], air mixture [137], exhaust air [138], and recirculation [139]. The total input air flow [119] is adjusted along with the input fuel flow [117] to change the emitter temperature [111] and to maintain the desired stochiometric mixture, which in some embodiments is monitored by the exhaust oxygen content [121], exhaust CO content [123], and/or exhaust hydrocarbon content [124]. The air is be mixed with the fuel at different places in the device [11], and the ratio of air mixed at different locations, the air mixture [137], is adjusted in some embodiments. Similarly, some air is mixed with the exhaust in some embodiments with catalytic converters, and the amount of this exhaust air [138] is adjustable in some embodiments. Similarly, some embodiments have recirculation [139] which is adjustable. Some embodiments use feedback [153] on the exhaust oxygen content [121], exhaust CO content [123], and/or exhaust hydrocarbon content [124], measured before and/or after the catalytic converter, in making these adjustments.

Some examples of fans [105] and pumps [106] operating parameters [52] include the fan voltage [127], the fan current [128], the pump voltage [131], and the pump current [130]. In some embodiments, input air flow [119], for example, is controlled by changing a fan voltage [127]. In some embodiments, input air flow [119], for example, is controlled by changing a fan current [128]. In some embodiments, input fuel flow [117], for example, is controlled by changing a pump voltage [131]. In some embodiments, input fuel flow [117], for example, is controlled by changing a pump current [130]. In some embodiments, coolant flow [135], for example, is controlled by changing a pump current [130], a pump voltage [131], a fan current [128], a fan voltage [127], or any combination of these.

Some example of electrical output [107] operating parameters [52] include the output current [132], the output voltage [133], the output phase [141], and the waveform [140]. In some embodiments where the electrical output [107] is either DC or AC, the output current [132] and/or the output voltage [133] are adjustable. In some embodiments where the electrical output [107] is AC, the output phase [141] and/or the waveform [140] are adjustable, for example to match the phase of the electrical grid [161]. The waveform [140] is comprised of frequency and shape, either or both of which are adjustable in some embodiments.

Figure 7:
FIG. 7 is an illustration of an embodiment showing conversion of an analog measurement to a digital measurement.
Figure 8:
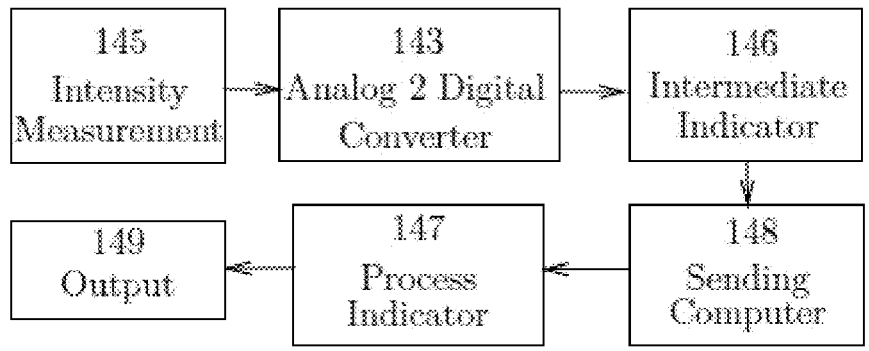
FIG. 8 is an illustration of an embodiment showing conversion and processing of an analog intensity measurement.
Figure 9:
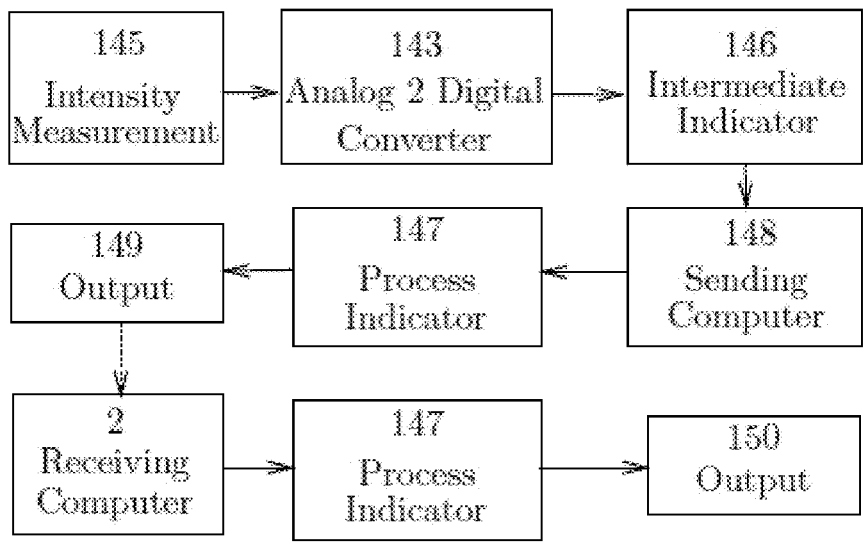
FIG. 9 is an illustration of an embodiment showing conversion and processing of an analog intensity measurement.

FIG. 7 shows an embodiment of an analog measurement [142] converted by an analog to digital converter [143] to a digital measurement [144]. An example, shown in FIG. 8, is a measurement of the intensity [109] of electromagnetic emissions [100] (intensity measurement [145]) from a chemically heated hot emitter, which would typically be an analog current measurement from a photocell. This analog measurement [142] would typically be converted to a digital measurement [144] by an analog to digital converter [143], the digital measurement [144] being an intermediate indicator [146] representing the chemically heated hot emitter electromagnetic emissions. This intermediate indicator [146] representing the chemically heated hot emitter electromagnetic emissions would typically be used by the computer system [2] for generator control [55], for example to match generator power delivered [56] to local load demand [54], for billing purposes, etc. Another intermediate indicator [146] representing the chemically heated hot emitter electromagnetic emissions is the generator power, the product of the output voltage [133], the output current [132], and the output power factor [134], since this intermediate indicator [146] represents a lower limit on the quantity of chemically heated hot emitter electromagnetic emissions. When used for billing or other such purposes, the intermediate indicator [146] representing the chemically heated hot emitter electromagnetic emissions would typically be processed [147] by a sending computer [148], the result being output [149] on an output device [5]. Some embodiments will have this output [149] transmitted to a computer system [2], which would process the intermediate indicator [147] and produce another output [150], as shown in FIG. 9. Any method of transmission is possible, ranging from electronic network transmission if the sending computer [148] is a networked computer [8], to transmitted manually by reading the output [149] from the sending computer [148] and manually inputting it into the receiving computer system [2].

Figure 10:
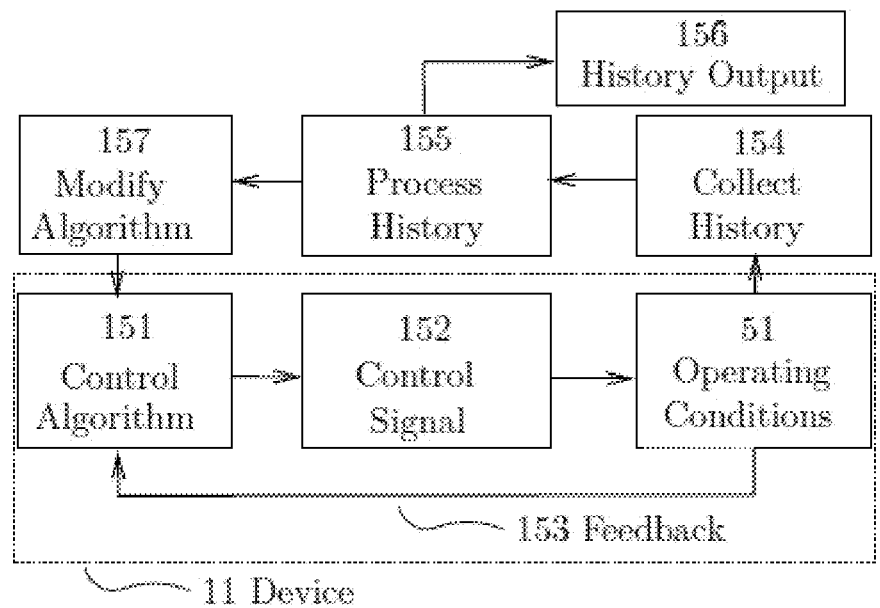
FIG. 10 is an illustration of an embodiment showing execution of a control signal to adjust operating conditions, with optional feedback, history collection and processing.

FIG. 10 shows an embodiment where a control algorithm [151] is used to produce a control signal [152] to change operating conditions [51]. An optional feedback [153] loop can be used by the control algorithm [151] to ensure that the changes in the operating conditions [51] produced by the control signal [152] are within tolerances by further adjusting the control signal [152] based upon the measured operating conditions [51]. Some embodiments collect operating conditions history [154]. The computer system [2] process this history [155] in various ways, depending on the embodiment. For example, the operating conditions history [154] can be processed to produce output from history [156]. One embodiment of this output from history [156] is a billing record for a quantity of chemically heated hot emitter emissions. In this embodiment the output from history [156] is an embodiment of an output [149]. Another embodiment is to process this history [155] to modify the control algorithm [157]. This modified control algorithm would replace the control algorithm [151] so as to change the operating conditions [51]. This change could be a change in a single parameter in the control algorithm [151], or in another embodiment, there is a change in the control algorithm [151] structure.

Figure 11:
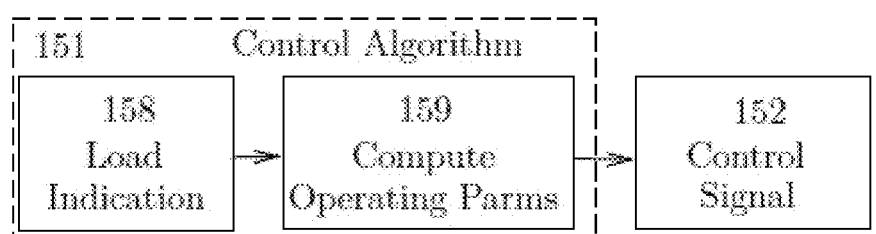
FIG. 11 is an illustration of an embodiment showing production of a control signal from a load indication.

FIG. 11 shows an embodiment in which the control algorithm [151] uses a load indication [158] to compute operating parameter(s) [159] and produce a control signal [152] to change the operating conditions [51] so as to meet at least some of the load demand. One embodiment of this for a chemically heated hot emitter generator is to use a measurement of the output voltage [133] as a load indication [158]: a drop in output voltage [133] is an indication of additional demand, so the control algorithm [151] would produce a control signal [152] to increase the hot emitter emissions until the output voltage [133] reached a level indicating that the demand was being met. Monitoring the output voltage [133] in this manner is an embodiment of a feedback [153] loop.

Figure 12:
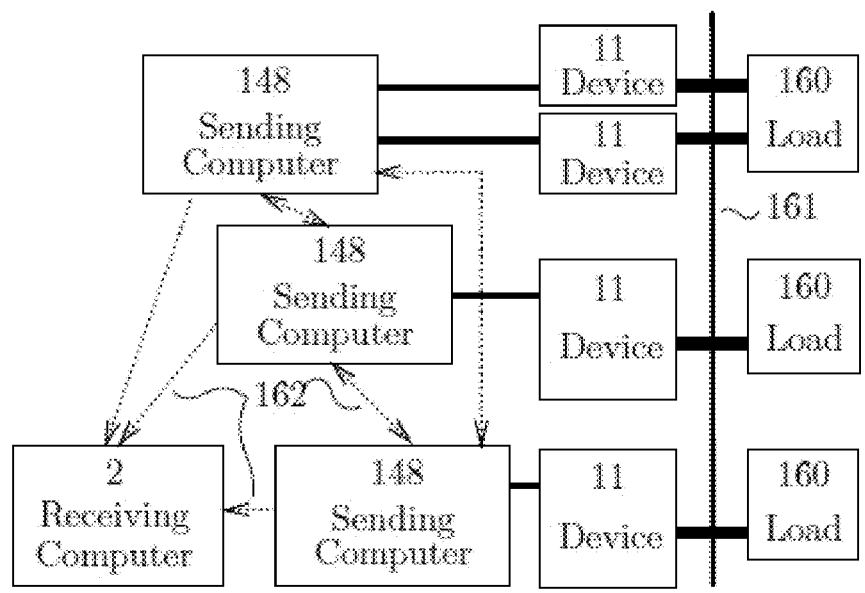
FIG. 12 is an illustration of an embodiment showing a plurality of devices.

A distributed chemically heated hot emitter power generation system embodiment implemented to power buildings is disclosed in the embodiment shown in FIG. 12. Each chemically heated hot emitter generator device [11] does not need to be able to provide the peak power demand of the load [160] (building or neighborhood) where the device [11] is located. A plurality of chemically heated hot emitter generators [11] can operate as a unit, as disclosed in U.S. patent application Ser. No. 13/595,062, which is incorporated by reference as if fully restated herein. Each sending computer [148] system can receive local load demand [54] information and send control signals [152] to generator control [55] (throttle) the local chemically heated hot emitter generator(s) [11]. When the capacity of this (these) local chemically heated hot emitter generator(s) [11] is (are) exceeded, the sending computer [148] can send communications [162] to neighboring sending computer [148] systems, which in turn can send control signals [152] to generator control [55] (throttle up) their respective additional chemically heated hot emitter generators on the same power network [161] to meet this peak load demand. With this embodiment there may be no need for a central power plant connected to the same power grid [161], though the grid can, if so desired, be interconnected as a backup.

Figure 13:
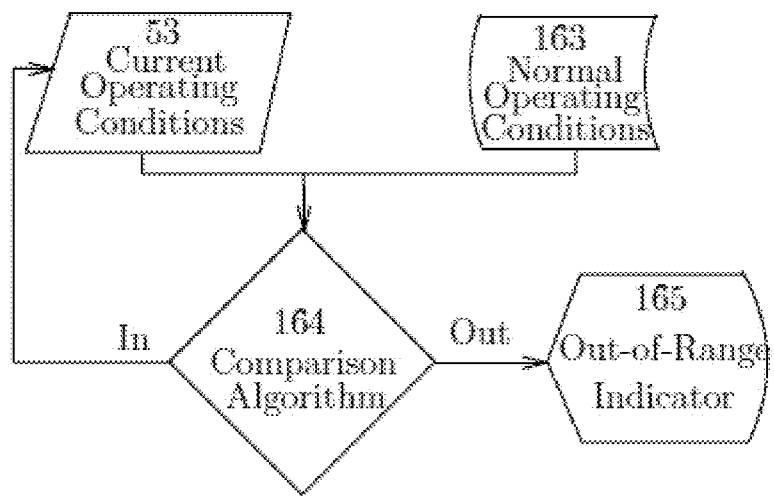
FIG. 13 is an illustration of an embodiment showing conversion of an analog measurement to a digital measurement.

FIG. 13 shows an embodiment of a comparison algorithm [164] run on a computer system [2] to determine whether the operating conditions [51] is within normal operating conditions [163]. When the operating conditions [51] are not within normal operating conditions [163], an out-of-range indicator [165] is produced. Depending upon the embodiment, non-limiting examples of this out-of-range indicator(s) [165] include an indicator light, a communication [162], a receiving computer system [2], for example to generate a maintenance request, etc. An example of an embodiment of the comparison algorithm [164] is a neural net algorithm that uses correlations between various operating conditions [51] to flag specific failure modes. For example, under normal operating conditions [163], a given range of fan current [128] will correspond to a specific range of fan speed [126] and input air flow [119]. An input air flow [119] below this range would be an indication of a blockage. Likewise, a given input air flow [119] and input fuel flow [117] would correspond to a range of emitter temperature [111] under normal operating conditions [163], and a deviation would be an indication of a fault. In some embodiments the normal operating conditions [163] would be determined by the operating conditions history [154] of the same device [11], while in other embodiments the normal operating conditions [163] would be determined by the operating conditions history [154] of one or more similar devices [11]. Some fault conditions will be signaled by deviations of a single operating condition [51], while other fault conditions will be signaled by subtle correlations between different operating conditions [51]. The embodiment of the comparison algorithm [164] to create an out-of-range indicator [165] for the case where the fault is indicated by a single operating condition [51] can be a conditional statement, while the embodiment of the comparison algorithm [164] to create an out-of-range indicator [165] for the case where the fault is indicated by a subtle correlation between two or more operating conditions [51] can be a neural net or similar algorithm trained on operating conditions history [154] where the fault has previously occurred.

Figure 14:
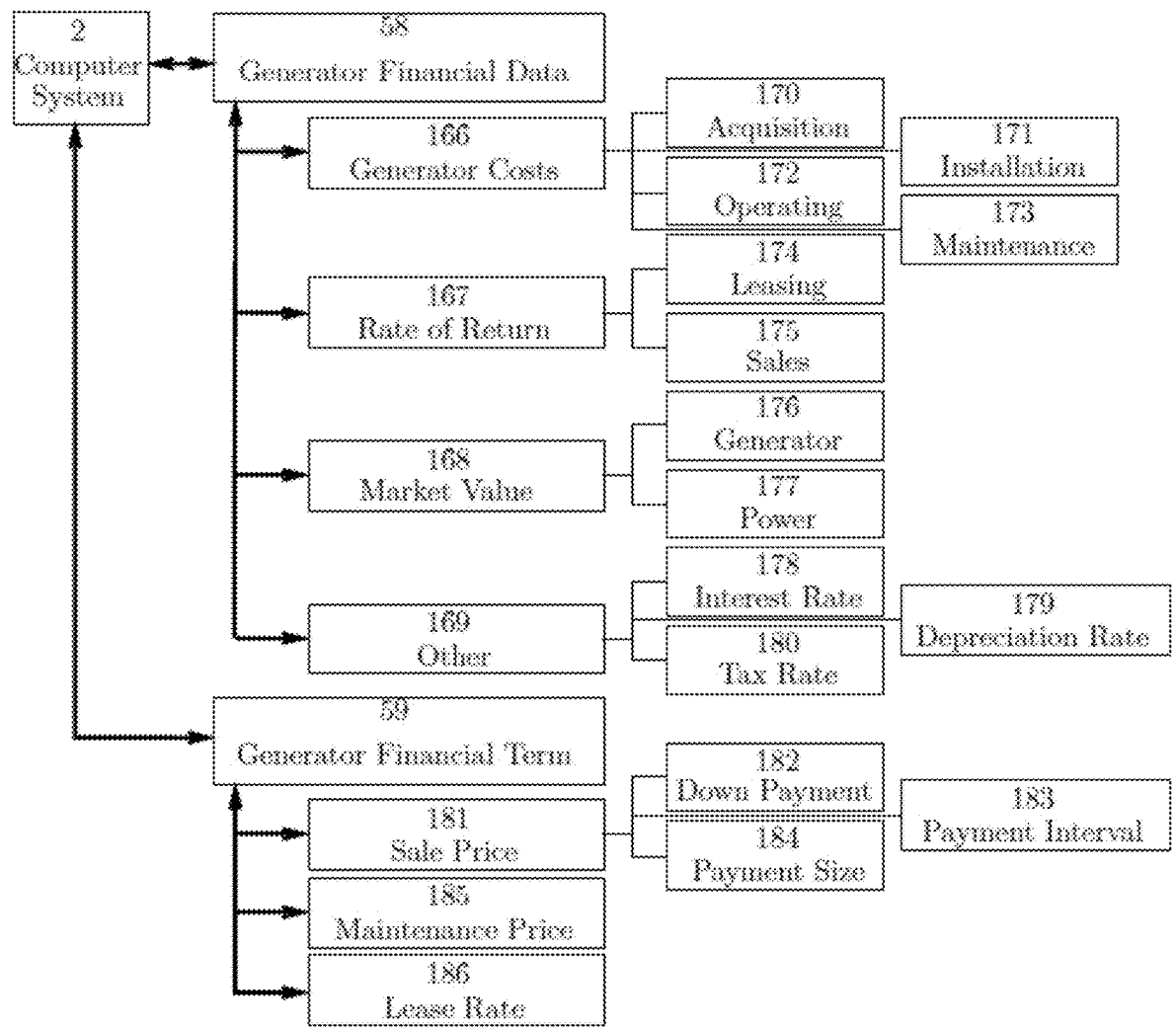
FIG. 14 is an illustration of an embodiment showing examples of financial data and financial terms.
Figure 15:
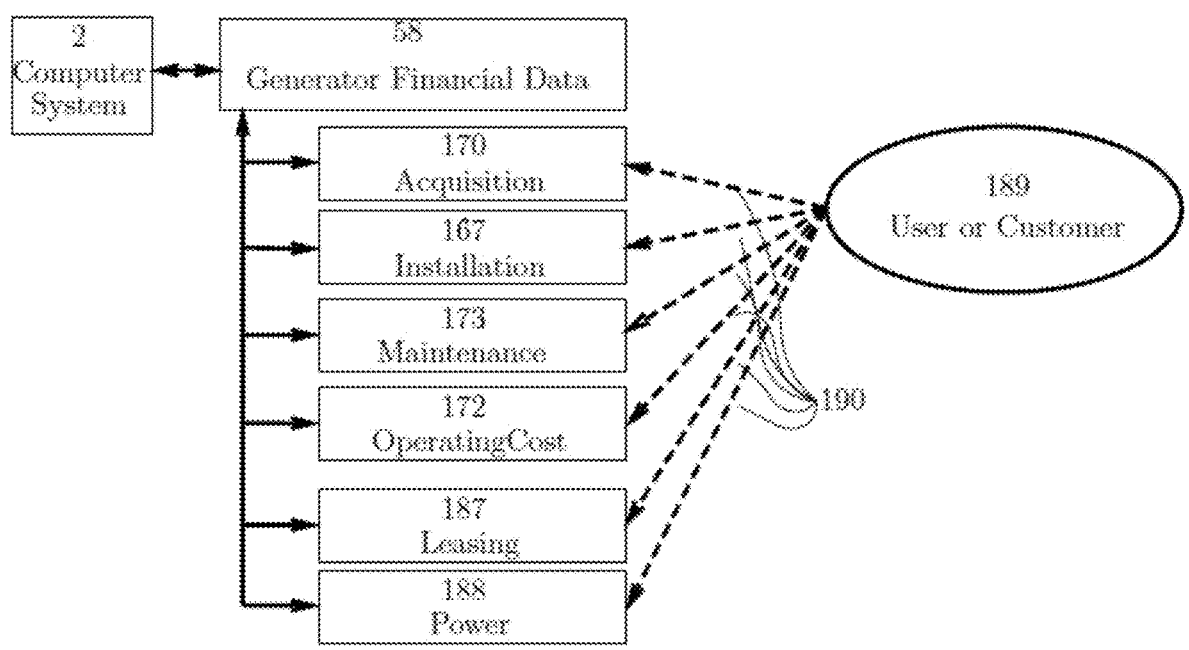
FIG. 15 is an illustration of an embodiment showing examples of financial payments.

FIG. 14 shows an embodiment of the means for receiving generator financial data [58] and processing these data to produce one or more financial terms generator financial term [59]. Exemplary data representing the chemically heated hot emitter generator of electromagnetic emissions can be a general product identifier, model number, code, or the like. The at least one other chemically heated hot emitter generator can be a particular one or ones of that product identifier, model number, code, or the like. For example, particular chemically heated hot emitter generators can be identified by a particular serial number or the like. In some, but not all embodiments, there can be a means configured to use the data representing the chemically heated hot emitter generator of electromagnetic emissions, related to an intermediate indicator of detected chemically heated hot emitter electromagnetic emissions, in producing output which is associated with at least one other chemically heated hot emitter generator of electromagnetic emissions having conformity with, but not operationally integrated in a unit comprising, said hot emitter generator of electromagnetic emissions, to operate said at least one other chemically heated hot emitter generator.

In some embodiments operating conditions history [154] is also processed to produce these generator financial terms [59]. In some embodiments some of the generator financial data [58] represent one or more chemically heated hot emitter generators, such as generator costs [166], example of which include acquisition cost [170], installation cost [171], operating cost [172], and maintenance cost [173]. In some embodiments the generator financial data [58] is comprised of a rate of return [167], such as a leasing rate of return [174] and/or a sales rate of return [175]. In some embodiments the generator financial data [58] is comprised of a market value [168], such as a generator value [176] and/or a power value [177]. In some embodiments the generator financial data [58] is comprised of other financial data [169], such as an interest rate [178], a depreciation rate [179], and/or a tax rate [180].

In some embodiments the generator financial term [59] produced by processing these generator financial data [58] is comprised of a sale price [181]. In some embodiments the sale price [181] is comprised of a down payment [182], a payment interval [183], and/or a payment size [184]. In some embodiments the generator financial term [59] is comprised of a maintenance price [185]. In some embodiments the generator financial term [59] is comprised of a lease rate [186].

A "processor" or "process" includes any hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

In FIG. 2 the flow of air 12 and fuel 18 through the chemically heated hot emitter generator are illustrated, wherein both the fuel and air pass through a heat exchanger 21. In the embodiment illustrated in FIG. 2 an input fan 13 forces the air 12 through an air splitter 14 from which a fraction of the air, herein called the quarter-air 17, is mixed with the fuel 18 in a manifold 19 to form an air/fuel mixture 20. The remainder of the air from the splitter 14, shown travelling through a flow adjuster 15, is herein called the bulk-air 16. The bulk-air 16 and the quarter-air 17 are shown traversing the heat exchanger 21 in separate channels.

Figure 16:
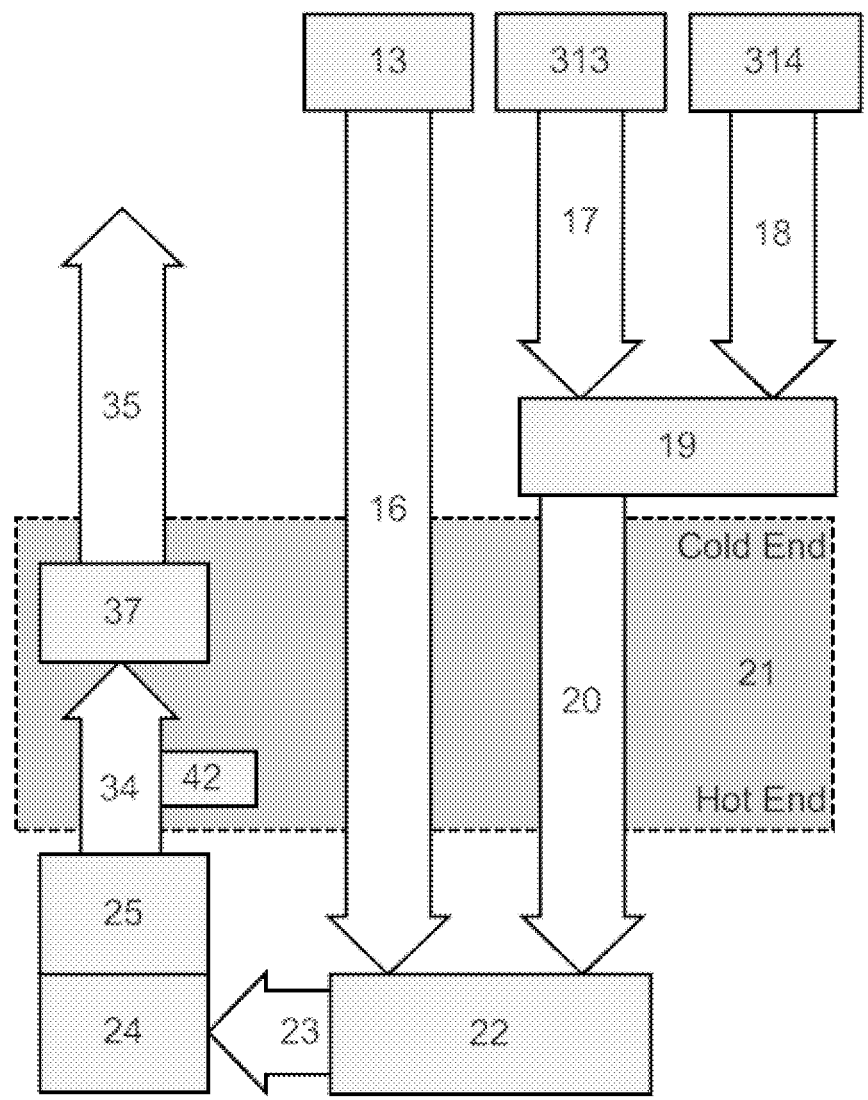
FIG. 16 is an illustration of an embodiment wherein there are a plurality of air intakes and intake fans.
Figure 17:
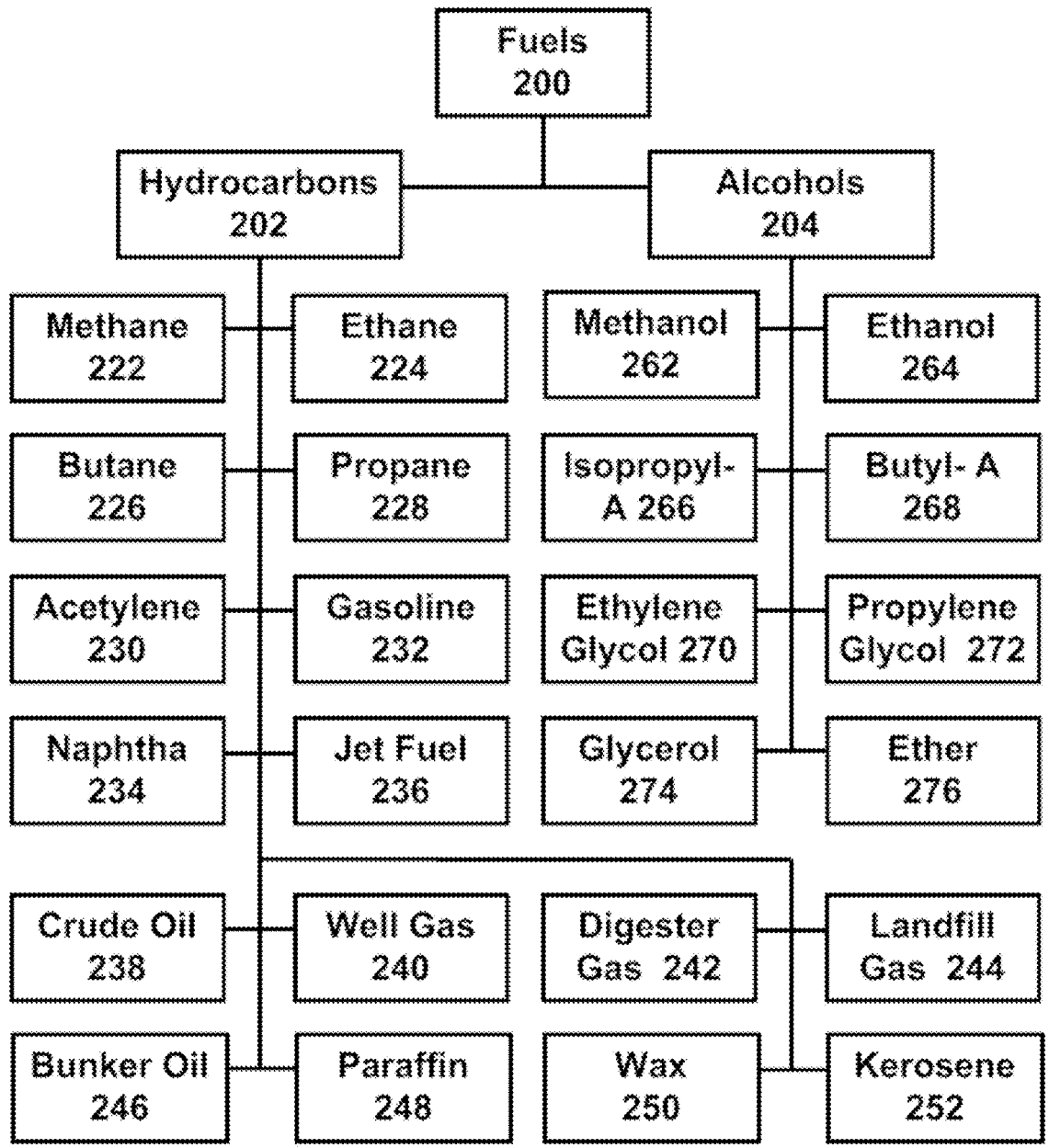
FIG. 17 is list of selected hydrocarbon and alcohol fuels.

In another embodiment illustrated in FIG. 16, an input fan 13 drives the bulk-air 16 through the apparatus while a separate fan 313 pushes the quarter-air 17 into the apparatus. In some embodiments, the bulk-air 16 is carried through the heat exchanger in two channels, each with comparable flow conductance as the channel carrying the air/fuel mixture 20. This embodiment matches the pressure drop though the heat exchanger, fan capacities, and/or flow velocities of the bulk-air 16 and air/fuel mixture 20.

Note that FIG. 16 also has explicitly shown a throttle 314 for adjusting the total amount of electrical power generated by the chemically heated hot emitter generator. The embodiment illustrated in FIG. 2 can also have a throttle.

Separating the bulk-air 16 flow into a plurality of channels can be carried out when natural gas or methane or the like is the fuel 18. When the natural gas alone was mixed directly with the bulk-air 16 at temperatures as high as 1700 degrees centigrade (as taught in incorporated application Ser. No. 11/828,311), the natural gas would thermally decompose into carbon and hydrogen. The carbon would exhibit itself in the form of soot within the fuel flow before the mixer 22 and deposit itself as solid carbon flow restrictions on surfaces within the generator. Eventually the solid carbon would build up enough to block flow and terminate operation of the generator.

In the case of methane or natural gas thermal decomposition is composed of the reaction $$CH_4 = C + H_2$$

where 75 kJ/mole of methane in thermal energy is must be added, which is the heat of formation of methane. Stoichiometric combustion is dictated by the reaction $$CH_4+2O_2=CO_2+2H_2O$$

with the accompanying liberation of 802 kJ/mole of methane, of which 393 kJ/mole comes from the formation of the carbon dioxide molecules and 242 kJ/mole comes from the formation of each water molecule. In an embodiment in which the bulk-air 16 is carried in two channels, when passing through the heat exchanger 21, most of the air/fuel mixture undergoes the transformation $$CH_4+0.5O_2=CO+2H_2$$

wherein a heat of 36 kJ/mole of methane is released into the heat exchanger 21. These resultant gasses at the output of the heat exchanger 21 are herein referred to as syngas. When the generator is cold and first started, no syngas is formed. As the temperature of the heat exchanger 21 rises eventually syngas begins to form, and at typical operational temperatures the majority of flow of the air/fuel mixture 20 exiting the heat exchanger 21 is in the form of syngas. Because syngas does not contain a significant quantity of bare carbon molecules, soot formation is mitigated. Formerly deposited carbon disappears during operations when syngas is generated.

In the combustion chamber the syngas is combined with the bulk-air 16 and undergoes the reaction $$CO+2H_2+1.5O_2=CO_2+2H_2O$$

which results in exactly the same exhaust gasses 34 as formed in the absence of syngas, but now with a reduced heat liberation of 767 kJ/mole of methane deposited into the combustion chamber 24 and emitting surface 25.

Of course, the generator is typically not operating on oxygen, but rather air. For every oxygen molecule in air there are approximately four nitrogen molecules. Table 1 contains a summary of the molar flow rates in the air/fuel channel and each of the two bulk-air channels in this embodiment. Note that the molar flow rates in the three channels are matched to within 7%. If the three channels all have the same cross-sectional areas, then the three flow rates are matched sufficiently to ensure complete combustion when the three streams are combined in a combustion chamber.

TABLE 1

Molar flow rates in the air/fuel channel and each of the two bulk-air channels under stoichiometric combustion conditions for methane.

| Channel | Air/Fuel | Bulk-Air #1 | Bulk-Air #2 |
|---|---|---|---|
| Methane | 1.00 | 0.00 | 0.00 |
| Oxygen | 0.50 | 0.75 | 0.75 |
| Nitrogen | 2.00 | 3.00 | 3.00 |
| Total | 3.50 | 3.75 | 3.75 |

In the case of propane thermal decomposition is composed of the reaction $$C_3H_8=3C+4H_2$$

where 105 kJ/mole of propane in thermal energy is must be added, which is the heat of formation of propane. Stoichiometric combustion is dictated by the reaction $$C_3H_8+5O_2=3CO_2+4H_2O$$

with the accompanying liberation of 2043 kJ/mole of propane. In embodiments in which the bulk-air 16 is carried in two channels, when passing through the heat exchanger 21, most of the air/fuel mixture undergoes the transformation $$C_3H_8+1.5O_2=3CO+4H_2$$

wherein a heat of 227 kJ/mole of propane is released into the heat exchanger 21. These resultant gasses at the output of the heat exchanger 21 are again syngas. When the generator is cold and first started, no syngas is formed. As was the case with natural gas, formerly deposited carbon disappears during propane operations when syngas is generated. Table 2 contains a summary of the molar flow rates in the air/fuel channel and each of the two bulk-air channels in this propane embodiment. Again, note that the three molar flow rates are reasonably well matched.

TABLE 2

Molar flow rates in the air/fuel channel and each of the two bulk-air channels under stoichiometric combustion conditions for propane.

| Channel | Air/Fuel | Bulk-Air #1 | Bulk-Air #2 |
|---|---|---|---|
| Propane | 1.00 | 0.00 | 0.00 |
| Oxygen | 1.50 | 1.75 | 1.75 |
| Nitrogen | 6.00 | 7.00 | 7.00 |
| Total | 8.50 | 8.75 | 8.75 |

Other fuels can be reformed in a similar manner to form syngas. As shown in FIG. 16, fuels 200 capable of syngas generation via partial oxidation include, but are not limited to, hydrocarbons 202 such as methane 222, ethane 224, butane 226, propane 228, acetylene 230, gasoline 232, naphtha 234, jet fuel 236, crude oil 238, well gas 240, bunker oil 246, paraffin 248, wax 250, and kerosene 252. Other hydrocarbons 202 that come from non-traditional sources are digester gas 242 from waste treatment plants and landfill gas 244. Similarly, alcohols 204 that can be used as fuels are methanol 262, ethanol 264, isopropyl-A 266, butyl-A 268, ethylene glycol 270, propylene glycol 272, glycerol 274, and ether 276. All of these fuels 200 are a subset of fuels 18 that may be employed in a chemically heat hot emitter generator. This list and a discussion of the function of catalytic converters 37 on the exhaust gasses following their combustion are found in utility U.S. Pat. No. 9,407,197. U.S. Pat. No. 9,407,197 is incorporated into this instant application by reference.

In the above discussion stoichiometric mixtures refer to mixtures of two reactants that are in the proper proportions in order to maximize or minimize a desired result. In the case of stoichiometric mixtures to generate syngas, the goal is to minimize the production of soot and the coating of carbon on surfaces inside of the apparatus illustrated in FIG. 2 or FIG. 16. In the case of stoichiometric combustion the goal is to minimize pollutants 34 such as NOX, carbon monoxide, or incompletely combusted hydrocarbon or alcohol molecules. Due to real world uncertainties such as turbulence and density variations, in both cases a mathematical or precise proportion of ingredients is not required for a mixture to nonetheless be considered adequately stoichiometric.

Figure 18:
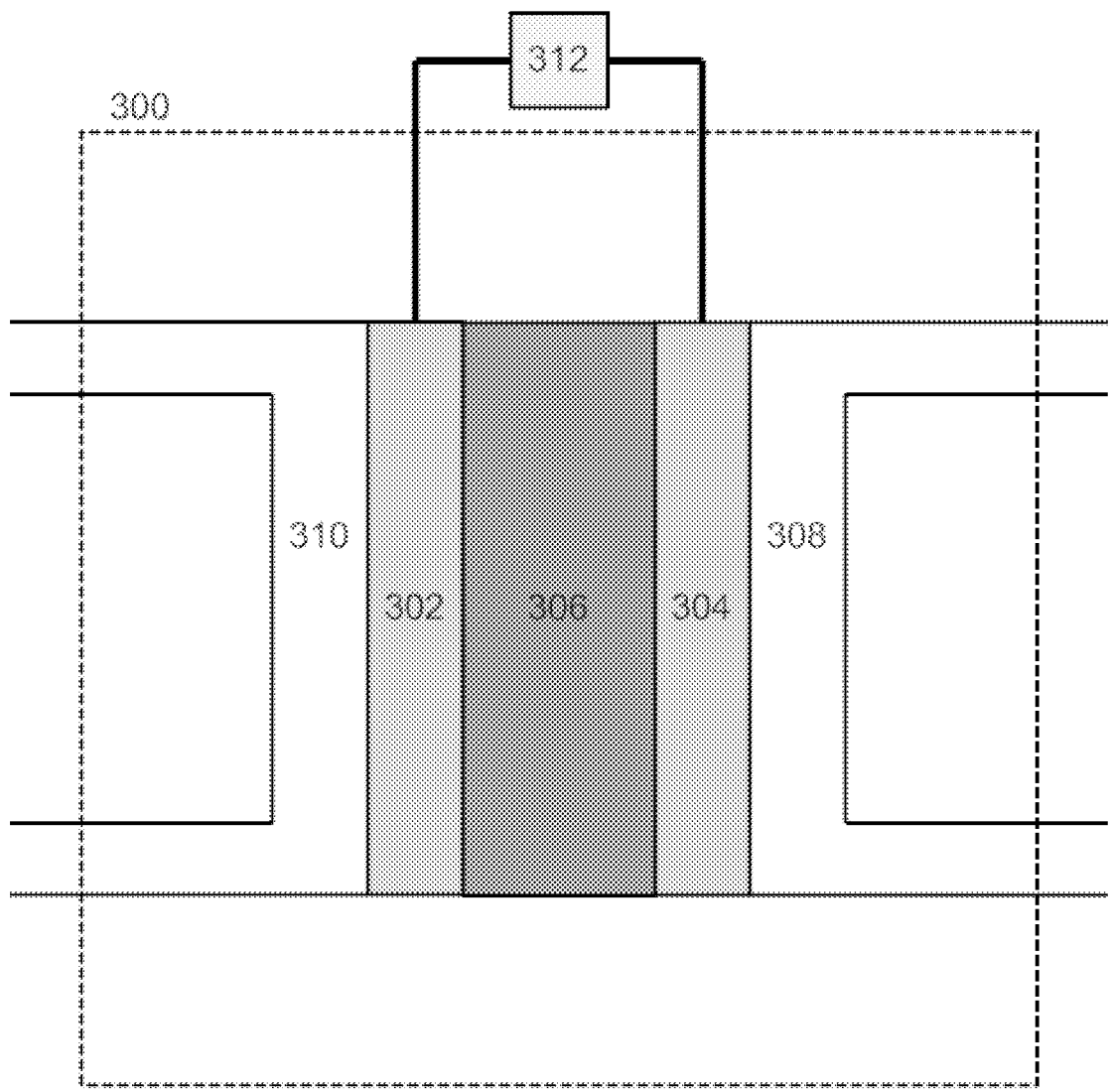
FIG. 18 is an illustration of a fuel stack including an anode, a cathode, a electrolyte, and associated gas channels.

As taught in the incorporated-by-reference utility U.S. Pat. No. 9,323,299, fuel cells are another type of electrical generator that convert chemical energy into electrical power. In the case of a chemically heated hot emitter generator the emitter of electromagnetic emissions is the highest temperature location in the generator. In the case of fuel cells the anode [302], cathode [304], and electrolyte [306] illustrated in FIG. 18 are the highest temperature locations in the generator.

A particular type of fuel cell is called a solid oxide fuel cell (SOFC). This type of fuel cell has a solid oxide electrolyte which passes oxygen ion between an anode and a cathode, causing electrons to flow from said anode to said cathode in the form of generated electrical power. As illustrated in FIG. 18, a SOFC fuel cell [300] is composed of an anode [302] and a cathode [304] that are electrically conductive and porous. Between them is a solid electrolyte [306] that conducts oxygen ions due to an oxygen density imbalance between the anode and cathode. As electrically charged oxygen ions flow from cathode [304] to the anode [302], the anode develops a negative voltage. In order to conduct oxygen ions, the electrolyte [306] can be maintained at temperatures as high as 1000 degrees centigrade.

Incorporated herein by reference, U.S. Pat. No. 7,422,822 teaches conductivity of the electrolyte up to temperatures of 900 degrees centigrade. As stated earlier, a chemically heated hot emitter runs as hot as 1700 degrees centigrade. In the case of the fuel cell the combustion process depletes the oxygen on the anode [302] side of the electrolyte [306], decreasing entropy and providing the needed oxygen gradient. Also, the heat released in the combustion process maintains the temperature of the electrolyte [306]. In the case of the chemically heated hot emitter the heat generated in the combustion process is directly transmitted to photovoltaic elements via electromagnetic emissions from the emitting surface [25]. In both cases efficient operations can use a heat exchanger [21] to maintain such elevated temperatures.

Figure 19:
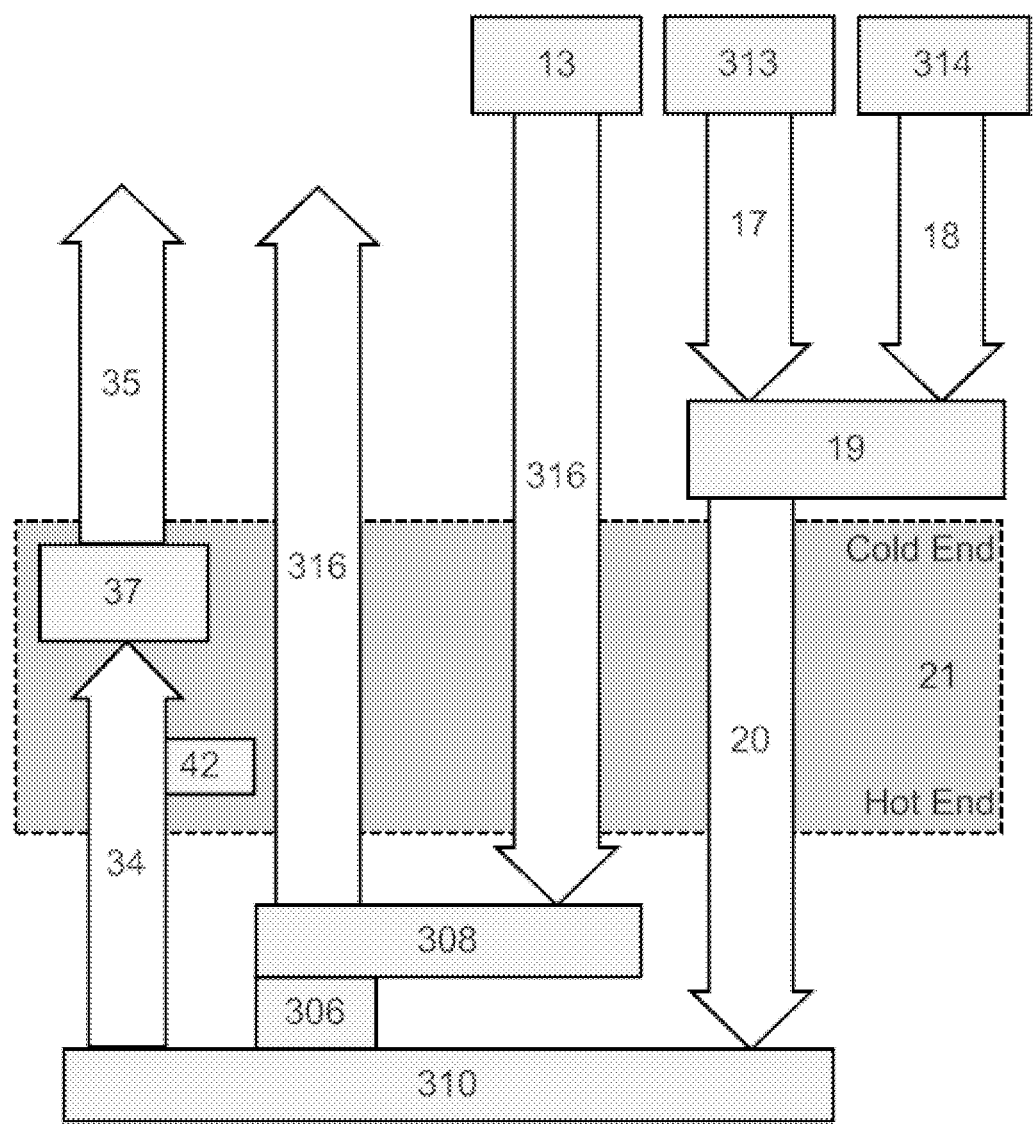
FIG. 19 is an embodiment of a fuel cell electrical generator.

FIG. 19 is an illustration of a fuel cell electrical generator that shares most of the features of the chemically heated hot emitter generator illustrated in FIG. 16. In this illustrated embodiment, the combustion chamber [310] is on the anode [302] side of the electrolyte [306]. The air carrying the oxygen [316] and fan [13] for moving this air within the channel is connected to the cathode [308] side of the electrolyte [306]. The incoming air [316] is depleted of oxygen when passing across the cathode [308] in the vicinity of the electrolyte [306]. This air stream [316] passes through the heat exchanger [21] twice in order to maintain system efficiency in the conversion of chemical energy into electrical power.

Most embodiments herein contrast with SOFC fuel cells. SOFC fuel cells are plagued by soot generation as fuel temperatures are preheated in advance of combustion. A common solution is to inject steam to reform hydrocarbon fuels into syngas. The introduction of steam comes with significantly more capital expense, complexity, and corrosion issues. The use of catalysts in the production of syngas is has the same drawbacks. Incorporated herein by reference, U.S. Pat. No. 9,105,894 teaches the use of catalysts to reform fuel in a heat exchanger.

Figure 20:
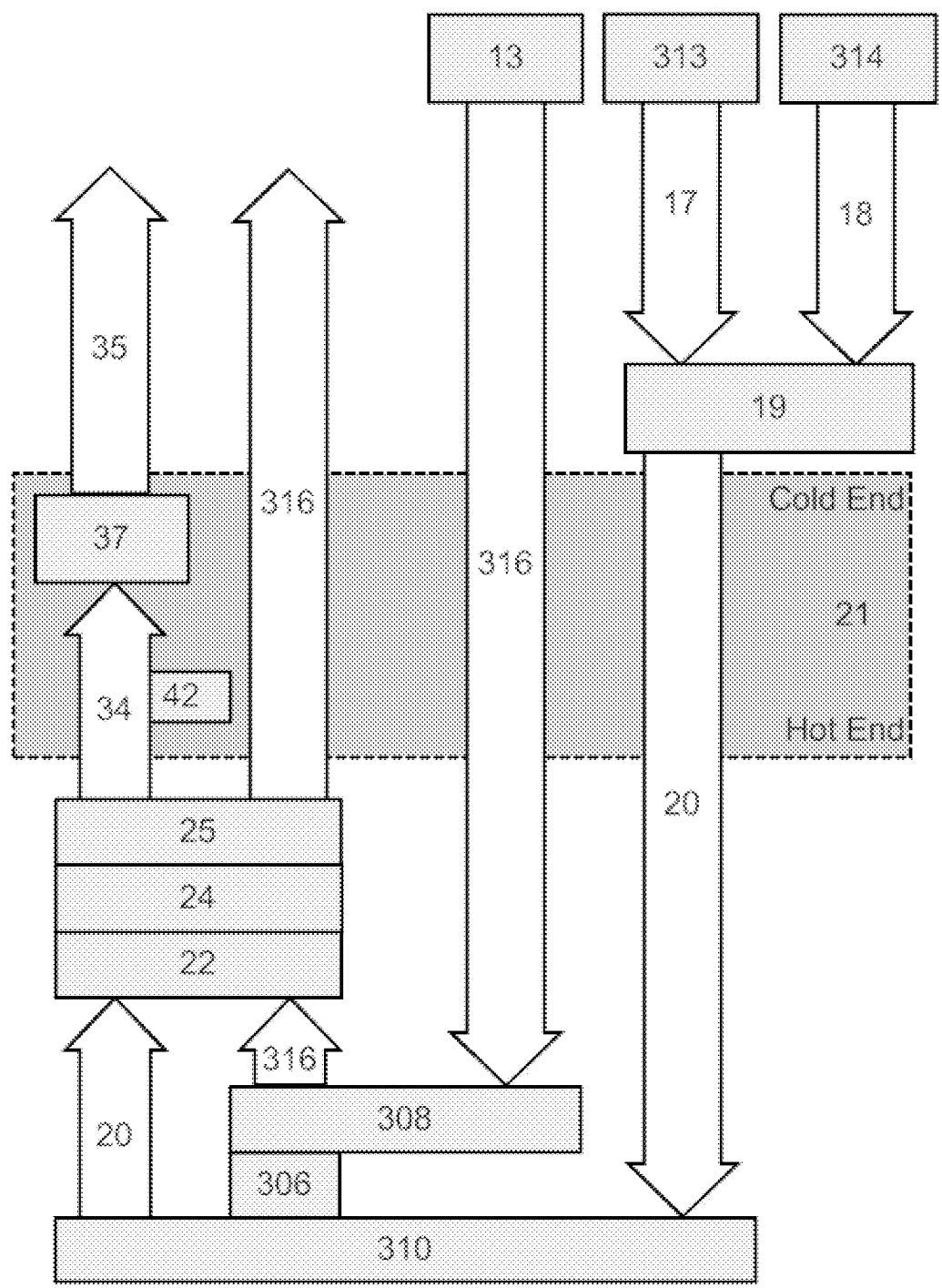
FIG. 20 is an embodiment of a fuel cell generator combined with an embodiment of a chemically heated hot emitter generator of electromagnetic emissions.

U.S. Pat. No. 9,105,894 also teaches further combustion of fuel and air after passing across the anode [302] and cathode [304], wherein this further combustion takes place within the heat exchanger [21] for the purpose of additional preheating of the air and fuel. An embodiment that makes better use of the partially combusted fuel typically found after flowing across the anode [302] is to place the mixer [22], combustion chamber [24], and emitting surface [25] of a chemically heated hot emitter generator from FIG. 16 downstream of the anode [302] but before reentry into the heat exchanger [21]. This embodiment is illustrated in FIG. 20.

Reference throughout this specification to "one embodiment", "an embodiment", or "a specific embodiment" means that a particular feature, structure, or characteristic described in connection with the embodiment is included in at least one embodiment and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment may be combined in any suitable manner with one or more other embodiments. It is to be understood that other variations and modifications of the embodiments described and illustrated herein are possible in light of the teachings herein and are to be considered as part of the spirit and scope of the present invention.

Embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of embodiments of the present invention can be achieved by any means as is known in the art. Further, distributed, or networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the disclosure herein to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments, including what is described in the Abstract and the Summary, are not intended to be exhaustive or to limit the invention to the precise forms disclosed herein. While specific embodiments of, and examples for, the invention are described herein for teaching-by-illustration purposes only, various equivalent modifications are possible within the spirit and scope of the present invention, as those skilled in the relevant art will recognize and appreciate. As indicated, these modifications may be made in light of the foregoing description of illustrated embodiments and are to be included within the true spirit and scope of the invention.

Note that the preceding is a prophetic teaching and although only a few exemplary embodiments have been described in detail herein, those skilled in the art will readily appreciate that many modifications are possible in the exemplary embodiments without materially departing from the novel teachings and advantages herein. Please understand that features illustrated in the Figures are often interwoven rather than integral and sequential, as in sub-steps. Accordingly, all such modifications are intended to be included within the scope herein. Means-plus-function language is intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment fastening wooden parts, a nail and a screw may be equivalent structures.

It will thus be seen that the objects set forth above, among those made apparent from the preceding description, are efficiently attained and, because certain changes may be made in carrying out the above method and in the construction(s) set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

The invention claimed is:

1. A method of generating electrical power, the method comprising:
   inputting air, including adjusting flow rate of said air;
   inputting fuel, including throttling flow rate of said fuel, wherein:
      said fuel flow rate and said air flow rate are in stoichiometric proportions for combustion, and
      said fuel is comprised of at least one hydrocarbon, alcohol, or both;
   combusting a mixture of said fuel and a portion of said air with the remainder of said air to produce heat, wherein prior to said combusting:
      combining said portion of said air with said fuel to produce said mixture that, when heated, stoichiometrically forms syngas;
      heating said mixture with the heat from said combusting;
      heating said remainder of said air with the heat from said combusting; and
      during said combusting, matching said remainder of said air with at least one of flow rate, pressure drop, and flow velocity of said mixture;
   generating electromagnetic emissions from the heat;
   harvesting said electromagnetic emissions with photovoltaic elements to produce electrical power;
   processing exhaust gasses produced during said combusting, wherein
      heat released from said processing is transferred into said mixture and said remainder of said air before said combusting, and
      said processing removes one or more pollutants from the exhaust gasses;
   measuring oxygen content of said exhaust gasses before said processing in ensuring said stoichiometric proportions.

2. The method of claim 1, wherein the fuel includes at least one hydrocarbon, and method is carried out devoid of combining steam with said hydrocarbon in order to form either carbon monoxide or hydrogen gas.

3. The method of claim 1, wherein the matching is carried out during said combusting.

4. The method of claim 1, wherein said combining a portion of said air with said fuel includes combining said air with said fuel to produce a mixture having excess air.

5. The method of claim 1, wherein said inputting fuel includes imputing methane.

6. The method of claim 1, wherein said inputting fuel includes imputing natural gas.

7. The method of claim 1, wherein said inputting fuel includes imputing propane.

8. The method of claim 1, wherein said processing is carried out with at least one catalytic converter.

9. The method of claim 1, wherein the adjusting of the flow rate of said air is carried out responsive to the measuring of the oxygen content.

10. The method of claim 1, further comprising;
    generating electrical power by transporting oxygen ions across a solid oxide electrolyte, said oxygen ions drawn from said remainder of said air and combusted with said mixture, said generating after the said heating and before said generating electromagnetic emissions.

11. A machine to generate electrical power, the machine comprising:
    a fuel inlet for fuel comprising at least one hydrocarbon, alcohol, or both;
    a throttle, connected to said fuel inlet, configured to adjust a flow rate of the fuel;
    air inlets for air;
    at least one fan located to push the air through said air inlets, said at least one fan adapted to adjust a flow rate of said air;
    a manifold structured to combine a portion of said air from said air inlets and said fuel from said fuel inlet to produce a mixture that, when heated, stoichiometrically forms syngas;
    a heat exchanger, arranged after said manifold, through which said mixture and a remainder of said air from said air inlets traverse;
    a combustion chamber, arranged after said heat exchanger, structured to stoichiometrically combust said mixture and said remainder of said air from said air inlets so as to form exhaust gasses;
    conduits, arranged to carry said mixture and said remainder of said air through said heat exchanger and into said combustion chamber, said conduits structured to match said remainder of said air with at least one of flow rate, pressure drop, or flow velocity of said mixture at an entry to said combustion chamber;
    an emitting surface, arranged to have thermal contact with said exhaust gasses, to produce electromagnetic emissions communicated to photovoltaic elements, wherein said exhaust gasses are directed back through said heat exchanger after said thermal contact with said emitting surface;
    an oxygen sensor within said heat exchanger, said oxygen sensor within a flow of said exhaust gasses;
    a catalytic converter, within said heat exchanger and downstream of said oxygen sensor, arranged so that said exhaust gasses flow through said catalytic converter.

12. The machine of claim 11 wherein, for every said conduit arranged to carry said mixture, there are two equal cross-section conduits carrying said remainder of said air.

13. The machine of claim 11, wherein there is no steam input into said machine.

14. The machine of claim 11, wherein flow velocities of said mixture and said remainder of said air are matched in said combustion chamber.

15. The machine of claim 11, wherein said manifold is configured to combine an amount of said air with said fuel that is in excess of stoichiometric proportions for combustion.

16. The machine of claim 11, wherein said fuel is methane.

17. The machine of claim 11, wherein said fuel is natural gas.

18. The machine of claim 11, wherein said fuel is propane.

19. The machine of claim 11, further including feedback, between the oxygen sensor and said at least one fan, arranged to maintain stoichiometric combustion.

20. The machine of claim 11, further comprising;
a solid oxide electrolyte with an electrically conducting anode on one side and electrically conducting cathode on another side, wherein:
    said solid oxide electrolyte is positioned after said heat exchanger and before said combustion chamber,
    said anode is located in a flow of said mixture, such that said mixture undergoing combustion is in proximity of the anode and with oxygen transported through said solid oxide electrolyte,
    said cathode is located in a flow of said reminder of said air, said air providing said oxygen that is transported through said solid oxide electrolyte, and
    electrical power is generated by transporting oxygen ions across a solid oxide electrolyte, said electrical power derived from harvesting electrons flowing from the anode to the cathode.

21. A method of generating electrical power, the method comprising:
    inputting air, including adjusting a flow rate of said air;
    inputting fuel, including throttling a flow rate of said fuel, wherein said fuel is comprised of at least one hydrocarbon, alcohol, or both;
    combusting a mixture of said fuel and a portion of said air with a remainder of said air to produce heat, wherein prior to said combusting:
        combining the portion of said air with said fuel to produce the mixture that, when heated, stoichiometrically forms syngas;
        heating the remainder of said air, said heat coming from said combusting; and
        heating said mixture, said heat coming from said combusting;
    generating electrical power by transporting oxygen ions across a solid oxide electrolyte, said oxygen ions drawn from said remainder of said air and combusted with said mixture;
    processing exhaust gasses produced during said combustion, wherein heat released from said processing is transferred into said mixture and said remainder of said air before said combusting, and
        said processing removes one or more pollutants from the exhaust gasses; and
    measuring oxygen content of said exhaust gasses before said processing in ensuring said stoichiometric proportions.

22. The method of claim 21, wherein the fuel includes the hydrocarbon, and the method is devoid of combining steam with said hydrocarbon to form either carbon monoxide or hydrogen gas.

23. The method of claim 21, wherein said inputting fuel includes inputting methane.

24. The method of claim 21, wherein said inputting fuel includes inputting natural gas.

25. The method of claim 21, wherein said inputting fuel includes inputting propane.

26. The method of claim 21, wherein said processing of at least one pollutant is carried out with at least one catalytic converter.

27. The method of claim 21, further including measuring oxygen content in carrying out said adjusting of the flow rate of said input air.

28. A machine to generate electrical power, the machine comprising:
    an inlet for fuel comprising at least one of a hydrocarbon, alcohol, or both;
    a throttle connected to said inlet for fuel, structured to adjust a flow rate of the fuel;
    air inlets;
    at least one fan arranged to push air through said air inlets, said at least one fan adapted to adjust a flow rate of said air;
    a manifold configured to combine a portion of said air and said fuel to produce a mixture that, when heated, stoichiometrically forms syngas;
    a heat exchanger, after said manifold, through which said mixture and a remainder of said air from said air inlets traverse;
    a solid oxide electrolyte with an electrically conducting anode on one side and an electrically conducting cathode on another side, wherein:
        said anode is located in a flow of said mixture, such that said mixture undergoing combustion is in proximity of the anode and with oxygen transported through said solid oxide electrolyte, and
        said cathode is located in a flow of said reminder of said air, said air including said oxygen that is transported through said solid oxide electrolyte, and
        electrical power is generated by transporting oxygen ions across a solid oxide electrolyte, said electrical power derived from harvesting electrons flowing from the anode to the cathode;
    a traversal to direct exhaust gasses from said combustion back through said heat exchanger;
    an oxygen sensor within said heat exchanger, said oxygen sensor within a flow of said exhaust gasses;
    a catalytic converter, within said heat exchanger and downstream of said oxygen sensor, arranged so that said exhaust gasses flow through said catalytic converter.

29. The machine of claim 28, wherein there is no steam input into said machine.

30. The machine of claim 28, wherein said fuel includes methane.

31. The machine of claim 28, wherein said fuel includes natural gas.

32. The machine of claim 28, wherein said fuel includes propane.

* * * * *